(No Model.)

J. G. SMITH.
ELECTRICAL SUCCESSION SIGNALING OR CALLING SYSTEM.

No. 547,897. Patented Oct. 15, 1895.

Witnesses
M. B. Harris
M. F. Boyle

Inventor
Jas. G. Smith
by T. F. Bourne
his attorney

UNITED STATES PATENT OFFICE.

JAMES G. SMITH, OF NEW YORK, N. Y., ASSIGNOR OF ONE-HALF TO ROBERT G. VASSAR, OF SAME PLACE.

ELECTRICAL SUCCESSION SIGNALING OR CALLING SYSTEM.

SPECIFICATION forming part of Letters Patent No. 547,897, dated October 15, 1895.

Original application filed January 14, 1895, Serial No. 534,738. Divided and this application filed February 23, 1895. Serial No. 539,360. (No model.)

*To all whom it may concern:*

Be it known that I, JAMES G. SMITH, a resident of New York city, county and State of New York, have invented an Improved Electrical Succession Signaling or Calling System, of which the following is a specification.

This application is a division of an application for patent on an improved electrical succession signaling or calling system, filed by me on January 14, 1895, Serial No. 534,738. In said original application is illustrated a signaling system wherein I provide a circuit with which are connected any desired number of signaling devices, such as call-bells, that are located on spur-wires leading from said circuit, each of which spur-wires may have a separate ground, the signaling devices thereby constituting stations. The spur-wires for the call-bells are provided with make-and-break contacts that are adapted to be operated by magnets in a normally-closed circuit provided with shunts around said magnets to keep the current in said normally-closed circuit from permanently energizing said magnets, the shunts having contacts to be broken by the armatures of said magnets; but when said magnets are energized their armatures will act to break the circuits through said call-bells and the shunts. The shunts around said magnets are arranged to be broken by magnets located on spur-wires leading from a main circuit, passing through all the stations, the armatures of which magnets are adapted to break the circuits through said shunts. These spur-wires each lead to ground, and when their magnets are energized their normal ground-circuits are broken (by the magnets in said normally-closed circuit) and a new ground is established, so as to keep said magnets energized for a space of time. When these magnets are energized, their armatures break the shunt-circuits and allow the current in the first-mentioned closed circuit to energize the magnets therein whose armatures cause the breaking of the circuits through the bells to prevent the bells in any stations between two connecting-stations from being operated. Provision is also made for breaking the circuit through the normally-closed line to restore the armatures and circuits to their normal conditions.

In my present application I provide shunts around said bells and magnets for the passage of the current instead of merely cutting off the grounds for the bells and magnets. This present application also embraces a slightly-different manner of running the line for the bell-circuit, as well as other novel details of improvement, more fully hereinafter set forth, and then pointed out in the claims. Thus by means of my system the call-bells or signaling devices are all normally in a completed circuit with a line passing through all the stations, and when one bell or signaling device is to be operated at a desired station all the bells or signaling devices between that one on the circuit and the calling-station have their individual circuits broken, so as to leave a through line between the calling and the called station.

Reference is to be had to the accompanying drawings, forming part hereof, in which—

Figure 1 is a diagrammatic view or illustration of my improved signaling and calling system. Fig. 2 is a detail of a circuit-closing lever.

In the accompanying drawings, the numeral 1 indicates a main wire for the signaling devices or call-bells 2. A B C are stations, at each of which a call-bell 2 is located, the wire 1 passing through said stations, any suitable number of said stations and bells being located on a circuit 1. The call-bells 2 are connected by a spur-wire 3 to ground 4, whereby a circuit is formed from 1 through 3 to ground. In the circuit 3 is a make-and-break device, shown consisting of a pivoted arm 5, having a spring 6 to keep it in engagement with a contact 7, that leads by wire $3^b$ to ground 4. By moving the arm 5 the circuit through the bell will be broken. By means of a suitable push-button, key, or switch 8, located on the wire 1, the bell 2 can be operated. The bells 2 are connected directly to the line-wire 1, the latter being connected to each binding-post $2^a$ $2^b$ of the bells 2, as shown. From the post $2^a$ the spur-wire 3 leads to the arm or lever 5 and to ground 4 through contact 7, as before explained. From the posts $2^b$ wires $3^a$ extend to contacts $7^a$, which are adapted to be engaged by the arms 5 when the latter are operated, in which position a shunt around the bell is closed from $2^b$ through $3^a$ $7^a$ 5 3 to $2^a$, so that the current in wire 1 follows said shunt (when the latter is closed) to cut out the bell from the line 1; but as this shunt is normally broken at $7^a$ 5 the normal circuit through the bell is from 1 to $2^b$, through the magnet of the bell to $2^a$, 3, 5, and 7 to ground 4. The push-buttons 8 are normally in connection with the line 1, preferably through spur-wires $1^d$, leading from ground $d$.

9 is a normally-closed line-wire having grounds 10 and battery 11, said wire passing through all the stations.

12 are magnets on the wire 9 at each station and adapted to be energized by the current in said wire. 13 are the spring-actuated armatures for the magnets 12, which armatures are adapted, when attracted by the magnets 12, to move the arms 5 to break the ground-circuits through the bells 2 and establish the shunts 3 $3^a$. Insulation 14 is located between the armature 13 and the arm 5, being shown carried by said armature, the latter being arranged to bear on the arm 5 to move the arm away from contact 7. If the magnets 12 were always energized by the current in wire 9, the circuit for the bell 2 would be continuously shunted. To avoid this and yet leave the circuit 9 so that it will serve to shunt the circuit around any bell when desired, I provide a shunt-circuit around each magnet 12, which shunt is adapted to be broken to enable the magnet 12 to operate. This shunt-circuit is shown consisting of a wire 15, connected with one terminal of the magnet 12 and leading to a contact 16.

17 is a lever or armature connected with a wire 18 that leads to the armature 13.

19 is a contact which the armature 13 engages when the magnet is de-energized, the contact 19 leading by a wire 20 to the wire 9 to complete the shunt around the magnet 12. Thus when the shunt-circuit is closed the current from the wire 9 will pass around said magnet; but when the shunt-circuit is broken, as at 16 17, the magnet 12 will be energized, and thereupon attract its armature 13, which will then move the arm 5 to break the ground-circuit through the bell and establish the shunt 3 $3^a$, at the same time breaking the shunt-circuit through 13 19, for a purpose hereinafter explained. Means for breaking the circuit through 9, so as to release the armatures 13 to restore the shunt-circuit at 13 19 and the circuits through the bells, are utilized, and will be explained farther on in this specification. The armatures 17 are actuated to break said shunt-circuits by means of magnets 21, that are located on a wire 23, which passes through all the stations on a circuit, the wire 23 being connected by wires 22 leading to ground. The wires 22 are connected with contacts 24 on the arms 5, which contacts are insulated from said arms, as shown. The contacts 24 may form a continuation of the arms 5, the parts thereof being separated by insulation 25, as shown, or otherwise arranged for the purpose. 26 are contacts normally in engagement with the contacts 24 and connected by wires 27 with ground, as 4. When the circuit is established through wire 23, it passes through 22, 24, 26, and 27 to ground at 4, thus energizing the magnet 21, which thereupon attracts its armature 17, breaking the shunt-circuit at 16. The normally-closed circuit 9 now energizes magnet 12, which attracts its armature 13, breaking the shunt-circuit again at 19, also moving the arm 5, which breaks the circuit 22 at 26, and also breaks the call-bell circuit 3 at 7, and establishes the shunt around said bell at 3 $3^a$, whereby the call-bell cannot be operated, thereby leaving the next call-bell at the next succeeding station in circuit to be operated, and so on successively, as desired, through all the stations on a circuit. Thus the call-bells of intermediate stations can be cut out, leaving a clear unbroken circuit between a calling-station and the call-bell at a station to be called. The circuit 22 through the magnet 21 being thus broken at 26, said magnet must be provided with a new ground to prevent the current from the calling-station from passing to the next station and operating its magnet 21 before the proper action is taken at the calling-station to operate the magnet 21 at the next station, and so on. For this purpose I provide an extra circuit to ground, as follows: 28 is a wire leading from one terminal of the magnet 21 to a contact 29, carried by the armature 17, and insulated therefrom. The contact 29, as the armature 17 is attracted by its magnet 21, is adapted to engage a contact 30, from which a wire 31 leads to ground $31^a$. By this means the circuit through 22 to ground is maintained through 28, 29, 30, and 31, notwithstanding the break at 24 26; but even when a circuit through magnet 21 is broken and the shunt-circuit re-established at 16 17 the shunt will be kept open, to keep the bell-circuit broken, until the circuit 9 is broken to permit the shunt-circuit to be restored at 13 19.

The operation of the features so far described is as follows: If a party at one station, as A, desires to call a party at station B, it is merely necessary to push button 8 at A when the circuit through the bell 2 at B will be closed from $a$, through 8 $1^d$ 1 $2^b$ at B, bell-magnet 3, 5, and 7 to ground. If a party at a farther station, as C, is to be called from A, the bell 2 at B is shunted from the line 1 by means of the magnets 21 and 12 operating the arm 5. To accomplish this the circuit through wire 23 must be closed, which then energizes magnet 21 at station B, which attracts its armature 17 and breaks the shunt-circuit at 16 17. The magnet 12 now becomes energized and attracts its armature 13, creating a further break in the shunt-circuit at 13 19, and also moving the arm 5, which breaks the circuit 3 through the bell 2 at 5 7 and establishes the shunt 3 3ᵃ, also breaking the circuit 22 at 24, 26, which is maintained through 28 29 30 to ground until the circuit 23 is broken at station A. The circuit through the call-bell at the intermediate station being thus broken enables the bell at the next station to be operated. When the parties have finished with the line they break the circuits 9 and 23, thus restoring all the parts to their normal conditions.

The magnets 21 are shown located directly on the line 23, the ground circuits 22 being connected with wire 23 at one side of (beyond) the magnets 21, the shunts for the magnets 21 being established as follows: 29ᵃ are contacts in normal engagement with the contacts 29 on the armatures 17. 29ᵇ are wires leading from the contacts 29ᵃ to contacts 29ᶜ, which are adapted to be engaged by contacts 13ᵃ, carried by and insulated from the armatures 13. The contacts 13ᵃ are connected with wires 23ᵃ, which lead to the terminals of the magnets 21 opposite the wires 28, (or to the wires 23.) With this arrangement, when the armature 13 at a station is attracted by its magnet 12 (through the breaking of the shunt 15 16 17 18 by magnet 21) the shunt around the corresponding magnet 21 will be partially established at 13ᵃ 29ᶜ, the shunt-circuit thus leading from 23 through 23ᵃ 13ᵃ 29ᶜ 29ᵇ 29ᵃ, the secondary ground for the magnet 21 being established from 28, 29, 30, and 31 to ground at 31ᵃ, when armature 17 is attracted. This shunt around the magnet 21 is completely established when the shunt at 16 17 is broken to cause the magnet 12 to attract the armature 13, and after the circuit through 23 is again broken to allow armature 17 to rise from its magnet. For this purpose I have shown a simple switching device consisting of contacts $f\,g\,h\,i\,j$, (one for each station on the line,) forming a set of contacts at each station, each set being connected by a spur-wire 23ᵇ with the line 23. Pivoted arms 33 (having contacts $e$) are connected with ground, as at $d$, and arranged to swing over the contacts $f\,g\,h\,i\,j$ and to make contact therewith. The arm 33 is made of metal and provided with a contact $e$, adapted to engage with contacts $f\,g\,h\,i\,j$ as said arm is swung around. The arm 33 and its contact $e$ are shown in Fig. 2.

54 are normally-closed contacts in the normally-closed line 9, so located that when the arm 33 is first moved it will operate the contact 54 to break the circuit through line 9 to restore the circuits controlled thereby. The normally-closed contacts 54 are more clearly shown in Fig. 2. The contacts 54 are shown composed of contact springs or pieces 55 56, respectively, normally in engagement, as shown, the part 55 being connected with one end of wire 9 and the part 56 being connected with the other end of wire 9, through which parts the line 9 is kept normally closed. The contacts $e$ on the arms 33 are arranged to bear on the springs 55 as said arms are moved to momentarily break the circuit through the line 9, thus restoring the shunt-circuits around magnets 12 as said arms are moved. (See Fig. 2.) When an arm 33 is moved to a contact, as $f$, the circuit will be established from ground through 33 $e\,f$ 23ᵇ to 23, thereby energizing magnet 21, next in circuit on the line, which, by attracting its armature 17, breaks the shunt at 16 17, causing magnet 12 to attract its armature 13, thus closing the shunt from said magnet 21 at 13ᵃ 29ᶜ, as well as breaking the ground through 22 at 24 26 and the ground through 3 at 5 7 and establishing the shunt for the bell 2 at 7 7ᵃ, also creating the new ground for 23 at 29 30. If a station farther along the circuit is desired, the arm 33 will be moved to $g$, thus breaking the circuit 23 at $f$, so as to release armature 17, which moves back, breaking the ground at 29 30, re-establishing the shunt at 16 17, and also completing the shunt around the magnet 21 at 29 29ᵃ, so that the current will flow around said magnet to the next magnet on the circuit, and so on successively through the contacts $h\,i\,j$, &c., to cut out the bells and magnets 21 at stations intervening between a calling and a called station.

In connection with the signaling or calling devices above set forth I may provide one or more telephone-lines having telephone-instruments to be used when a subscriber is called, substantially set forth in my said application, Serial No. 534,738, of which this application is a division, and to which I refer for an explanation of such an arrangement of telephones.

It will be further understood that by my system all the call-bells or signaling devices are normally in circuit with the line 1, and that to operate any desired bell on the line it is only necessary to remove or cut out the circuit in the bell or bells between a calling and a called station. It will be also observed that in my system the call-bell cut-out devices of the several stations operate individually and separately and not in unison—that is to say, only one circuit-breaker on a line operates at one time in response to a single impulse or pulsation in said line—and when said circuit-breaker has moved to break its corresponding call-bell circuit it does not operate again until after the whole line has been restored. Another point to be observed is that the line-wire 1 is normally divided into sections, as by the spur-wires 3, and that it is necessary to break the circuit through a spur-wire at one station before the line will be clear to the next station, and that to keep the line clear to any one station from another the circuit through any wire 3 must be kept broken to permit the passage of the current to the next station.

It will be observed that the lines 1 and 23 pass through all the stations in two directions, one side of the line 1 being connected to push-buttons 8 and the corresponding side of line 23 being connected to the contacts $f$ $g$ $h$ $i$ $j$, the other side of the line 1 passing to the bells or electrical instruments 2, the corresponding side of line 23 passing to the electrical devices for breaking the individual circuits for the bells, as to the magnets 21 and grounds 4 at each station. With this arrangement, when one station calls another the current passes from $1^d$ at the calling-station to line 1, thence along said line and around the station at one extremity of the circuit, and thence through that station to the others on the line to the one desired, the current in line 23 correspondingly passing through the stations in two directions to the magnets 21. Now, if station C is to call station A (or the station on the right) the call-bell at B is first cut from the line or shunted, then the bell at C is likewise cut out or shunted, (which is at the calling-station,) and thus the line is opened or cleared to the bell at the called station, or A. As the bells 2 are normally in circuit with the line 1 through their grounds, the cutting off of a ground and establishing the shunt for a bell 2 at an intermediate station provides a through line from a calling to a called station.

Having now described my invention, what I claim is—

1. An electrical circuit comprising a line wire, a signaling instrument connected therewith, a normally broken shunt around said instrument, and containing a contact normally leading to ground, a normally closed line wire having a magnet 12, and armature 13, to operate said contact to break the ground for the signaling instrument and close the shunt around said instrument, a shunt around the magnet 12 and a line circuit having electrical devices to break the shunt around the magnet 12, as and for the purpose specified.

2. An electrical circuit comprising a line wire, a signaling instrument connected therewith, a shunt around said instrument, having a contact to normally break said shunt and leading to ground, a normally closed line having a magnet 12 and armature 13, the latter being arranged to operate said contact to break the ground and close the shunt around the signaling instrument, a shunt around the magnet 12 having a contact to engage the armature 13, a line wire 23 having a magnet 21 and an armature 17 included in the shunt around the magnet 12, and a shunt around the magnet 21 having a wire connected with a contact carried by the armature 13, and a wire $29^b$ having contacts $29^a$, $29^c$, to be engaged respectively by a contact 29 on the armature 17, and the contact on the armature 13, all arranged as herein specified.

3. The combination of a circuit having a contact to break it, with a magnet 12 and armature 13, the latter being arranged to operate said contact, a shunt around said magnet, said armature being included in said shunt, a magnet 21, and armature 17, the latter being also included in said shunt, and a shunt around the magnet 21, arranged to be closed and broken by both the armatures 13 and 17, substantially as specified.

4. The combination of two magnets 12 and 21, and armatures 13 and 17 for said magnets respectively, with a wire extending from the magnet 21 to a contact carried by the armature 13, and a wire $29^b$, having a contact $29^c$ normally out of engagement with the contact on the armature 13, and a contact $29^a$, normally in engagement with a contact on the armature 17, and a wire connecting the latter contact with the magnet 21, substantially as specified.

5. In a signaling system, the combination of a circuit having a contact 5, leading to ground, a magnet 12 having an armature 13, to operate said contact a shunt around said magnet, the armature 13 being included in said shunt, a magnet 21 having an armature 17 included in said shunt, a shunt around the magnet 21 leading to a contact on the armature 13, a wire $29^b$ in said shunt having contacts $29^a$ and $29^c$, and a wire 22 leading from said magnet 21 to a contact 24 on the contact 5, a contact 26 leading to ground and normally engaging the contact 24, and a wire 31 leading to ground and having a contact 30 to be engaged by the contact 29 on the armature 17, all arranged substantially as specified.

6. In a signaling system having a plurality of stations, a wire passing through said stations in opposite directions, signaling instruments at said stations connected with the portion of said wire extending in one direction, means at each station adapted to cut the signaling instrument at that station from the line and means at said stations connected with the portion of said wire extending in the opposite direction adapted to operate the signaling instruments on said wire, substantially as herein specified.

7. In a signaling system having a plurality of stations, a wire passing through said stations in opposite directions, signaling instruments at said stations connected with the portion of said wire extending in one direction, said signaling instruments having individual circuits leading from said portion of said wire, means at said stations connected with the portion of said wire extending in the opposite direction adapted to operate the signaling instruments on said wire, and means at each station for breaking the individual circuit of any signaling instrument in another station to establish a through-line to the next station, substantially as herein specified.

8. In a signaling system having a plurality of stations, two wires passing through all of said stations in opposite directions, signaling instruments connected to the portion of one of said wires at each station that extends in one direction, said signaling instruments having individual circuits at each station leading from said wire, means at each station connected with the portion of said wire which extends in the opposite direction adapted to operate said signaling instruments, and electrical devices connected with that portion of the second-mentioned wire which extends in one direction through the stations to break the individual circuits of said instruments, and means connected with the oppositely extending portion of said second-mentioned wire adapted to operate said electrical devices connected with the other portion of said wire, substantially as herein specified.

9. In a signaling system having a plurality of stations, two wires passing through all of said stations in opposite directions, signaling instruments connected to the portion of one of said wires at each station that extends in one direction, said signaling instrument having individual circuits at each station leading from said wire, means at each station connected with the portion of said wire which extends in the opposite direction adapted to operate said signaling instruments, and electrical devices connected with that portion of the second-mentioned wire which extends in one direction through the stations to break the individual circuits of said instruments, and means connected with the oppositely extending portion of said second-mentioned wire adapted to operate said electrical devices connected with the other portion of said wire, and a third wire passing through all of said stations adapted to operate in conjunction with said electrical devices to break the individual circuits of said signaling instruments, and means connected with said third-mentioned wire arranged to act on said electrical devices to restore the circuits through said instruments substantially as herein specified.

10. In a signaling system having a plurality of stations, two wires running in opposite directions through said stations, one of said wires having electrical instruments connected with it, said instruments having individual circuits at said stations leading from said wire the other wire having electrical devices to effect the breaking of said individual circuits in said electrical instruments at one station to permit the current to pass to the electrical instrument at the next station, and means connected with the opposite portion of said wire for operating the devices connected with said wires, substantially as herein specified.

11. In a signaling system comprising a plurality of stations, a wire leading through all said stations in two directions, signaling instruments at each station which have individual circuits leading from one portion of said wire, and means in each station connected with the other portion of said wire for operating the electrical instrument at the first station of the series directly, and circuit changing devices in said first station arranged to be operated from any station on the series for breaking the individual circuit of the electrical instrument in said first station and for establishing a through line to the station beyond.

In testimony that I claim the invention above set forth I affix my signature in presence of two witnesses.

JAMES G. SMITH.

Witnesses:
T. F. BOURNE,
M. F. BOYLE.